J. T. HOFER.
FISH BOX.
APPLICATION FILED MAR. 18, 1915.

1,185,798.

Patented June 6, 1916.
2 SHEETS—SHEET 1.

Witnesses
Fenton S. Belt
J. W. Sherwood

Inventor
J. T. Hofer
By Franklin H. Hough
Attorney

J. T. HOFER.
FISH BOX.
APPLICATION FILED MAR. 18, 1915.

1,185,798.

Patented June 6, 1916.
2 SHEETS—SHEET 2.

Witnesses
Fenton S. Belt
J. W. Sherwood

Inventor
J. T. Hofer
By Franklin H. Hough
Attorney

UNITED STATES PATENT OFFICE.

JOHN T. HOFER, OF AUSTIN, TEXAS.

FISH-BOX.

1,185,798.  Specification of Letters Patent.  Patented June 6, 1916.

Application filed March 18, 1915.  Serial No. 15,250.

*To all whom it may concern:*

Be it known that I, JOHN T. HOFER, a citizen of the United States, residing at Austin, in the county of Travis and State of Texas, have invented certain new and useful Improvements in Fish-Boxes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in collapsible boxes or cages adapted especially for fish boxes, etc., and consists of a simple and efficient apparatus of this nature which, when not in use, may be folded into a compact shape and, when open for use, so constructed and connected that the corners will be rigidly reinforced.

My invention is illustrated in the accompanying drawings, in which:—

Figure 1:
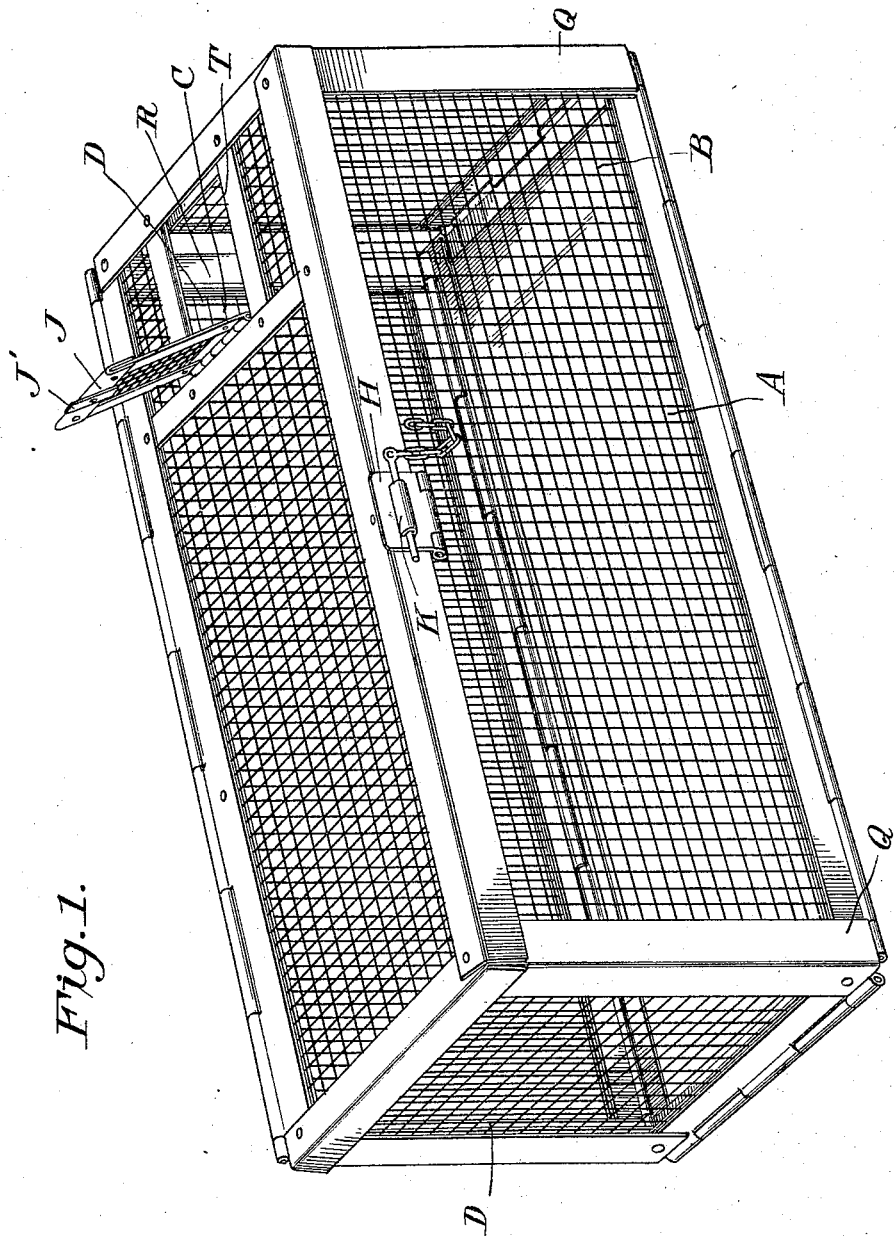
Figure 2:
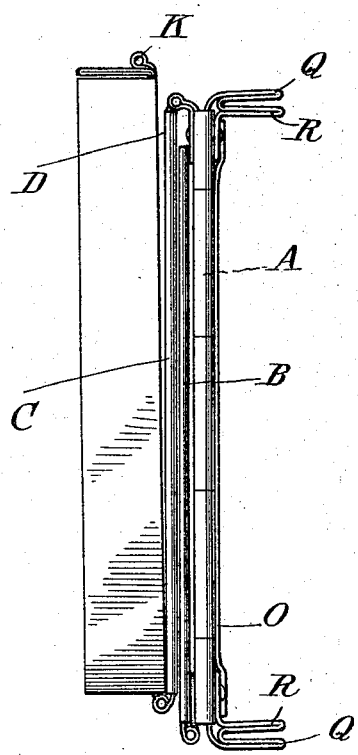
Figure 4:
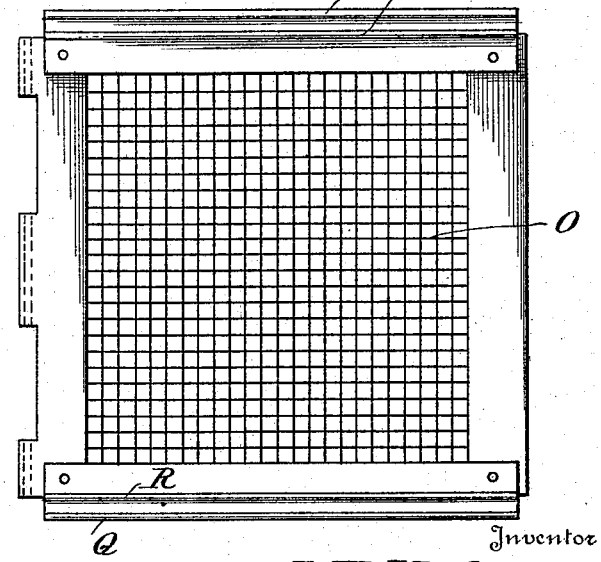
Figure 3:
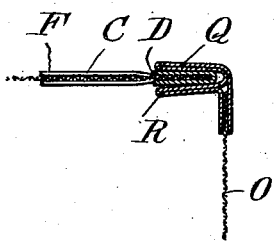

Figure 1 is a perspective view showing the trap or cage open for use. Fig. 2 is a view showing it collapsed. Fig. 3 is a detail sectional view through one of the corners when the cage is set up, and Fig. 4 is a plan view of one end of the cage.

Reference now being had to the details of the drawings by letter, A' designates the top and A the bottom of the cage which, in the present instance, is shown as solid, and B and C are the sides, the central portion of which are made preferably of wire netting, and which slides are hinged upon the opposite longitudinal edges of the bottom. The side C is provided with flanges, designated by letter D, upon the ends thereof and one edge flange F upon the longitudinal edge, while the side B is flangeless and is provided with a slotted tongue H for the reception of a latch K in which a key may be placed. The ends of the cage are of similar construction and each is designated by letter O, and which are hinged to the end of the bottom. The opposite edges of the ends are provided with double flanges, designated respectively by letters Q and R, which are spaced apart parallel to each other, the space between the same being sufficient to receive the ends of the sides B and C in the manner shown in the sectional view of the drawings, thus securely reinforcing and bracing the corners.

When the box is set up, the sides are first turned at right angles to the bottom, after which the ends are closed against the ends of the sides interlocking with the ends thereof and after which the flanged top may be swung down over the sides and ends which have been interlocked, thereby securely holding the sides and ends in place. The top is provided with a suitable opening T, closed by a door J which has a fastener J' secured thereto.

By the provision of a collapsible receptacle shown and described, it will be noted that a simple and efficient device is provided especially adapted as a fish box or for carrying commodities of any kind which, when not in use, may be reduced to a compact form.

What I claim to be new is:—

A collapsible receptacle having a bottom with sides and ends hinged thereto, each end having right angled corner strips, a portion of each of which is bent upon itself to form a slot at right angles to the plane of the end and adapted to receive the end of an adjacent side, a top hinged to a side and having right angled flanges designed to fit over the ends and sides of the receptacle.

In testimony whereof I hereunto affix my signature in presence of two witnesses.

JOHN T. HOFER.

Witnesses:
MAX RICHTER,
J. E. BISHOP.